Feb. 6, 1934.   H. V. CHURCHILL   1,946,149
HAM BOILER AND THE LIKE
Filed July 13, 1931

INVENTOR
Harry V. Churchill
BY
ATTORNEY

Patented Feb. 6, 1934

1,946,149

UNITED STATES PATENT OFFICE 1,946,149

HAM BOILER AND THE LIKE

Harry V. Churchill, New Kensington, Pa., assignor to Aluminum Company of America, Pittsburgh, Pa., a corporation of Pennsylvania Application July 13, 1931. Serial No. 550,442

3 Claims. (Cl. 148—32)

The invention relates to vessels used for the preparation of foods and particularly to vessels generally known in the art as ham boilers and adapted for use in the steaming or boiling of salted meats such as hams.

Because of its many well known advantages for this and similar purposes, aluminum, or an alloy of aluminum, has been generally selected as the material from which vessels of this type should be made, and accordingly large numbers of ham boilers and similar vessels have been fabricated from aluminum sheet or cast of aluminum in sand or permanent molds. One of the more common applications of aluminum to this particular type of vessel is its use in commercial ham boilers which find an extensive application in the meat-packing industry. The field of usefulness of aluminum in connection with the preparation and preservation of foods, and boiling or steaming of meats, has been circumscribed by disadvantages arising from the use of aluminum in contact with foods such as meats which form, with water or steam, agents which have a tendency to corrode the surface of the aluminum, destroying its smooth finish and forming pits or depressions therein.

A common example of this is where aluminum is used for vessels intended for the steaming or boiling of hams. The hams are pressed tightly against portions of the walls, bottom and cover of such a vessel and the vessel thereafter placed in a steam chamber or immersed in boiling water. Under these conditions the surface of the aluminum becomes pitted or roughened. This pitting is often slight but in some cases it becomes somewhat deep. The depressions in the surface formed by the pitting are often of such size that it is possible for small particles of meat or other food to lodge therein in such a manner that the ordinary processes of cleaning do not entirely remove them. It is apparent that these conditions, or possibilities of these conditions, are unsatisfactory, particularly from the standpoint of absolute sanitation, and although it is possible to avoid any such consequences by means of very rigorous cleaning operations, it is difficult in industrial food packing plants to provide cleaning operations on a large scale that will entirely obviate the possibility of such conditions. Consequently, it is necessary that a more rigorous inspection of the vessels be undertaken than is desirable. The Institute of American Meat Packers has long sought a solution of this problem and various corrosion-resistant alloys have been proposed and tried. The results have not been such as to overcome the difficulties which have been pointed out hereinabove, and up to the time of my invention no commercially satisfactory solution of the problem has been presented.

One method of overcoming the corrosion problem was to form a fired enamel coating on the surface of the vessel. This type of coating has proved very unsatisfactory because of its tendency to chip and flake off, thus not only contaminating the food but exposing the surface to corrision and forming a trap for particles of food, making the vessel difficult to clean.

It is an object of my invention to overcome these and other disadvantages inherent in aluminum vessels heretofore used for the purposes stated.

More particularly, it is an object of my invention to provide a vessel for the treatment or preparation of food which is resistant to the destructive oxidation which may attend the application of aluminum for these purposes.

A further object of my invention is the provision of an aluminum vessel having formed thereon a coating which is highly resistant to attack by the corrosive agencies encountered in the preparation of certain foodstuffs.

A specific object is the provision of a sanitary and indestructible ham boiler.

These and other objects of my invention will more fully appear upon a reading of the description of my invention in connection with the drawing, in which.

To enable those skilled in the art to successfully practice my invention, I will now describe one way in which it can be carried out.

Figure 1:
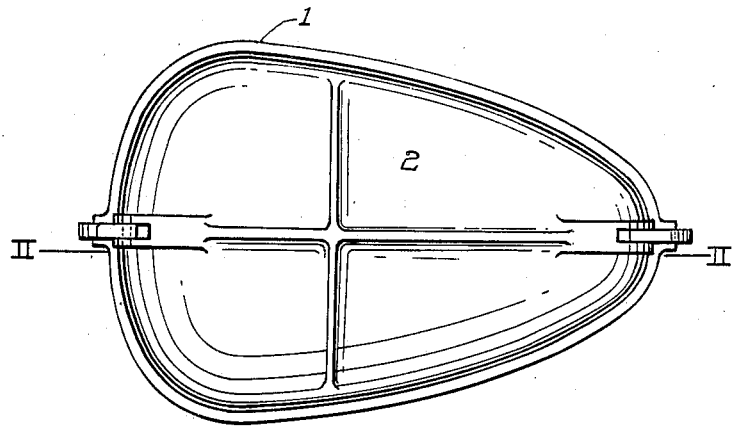
Fig. 1 is a plan view of a ham boiler embodying my invention, with the cover shown in assembled relationship thereto.
Figure 2:
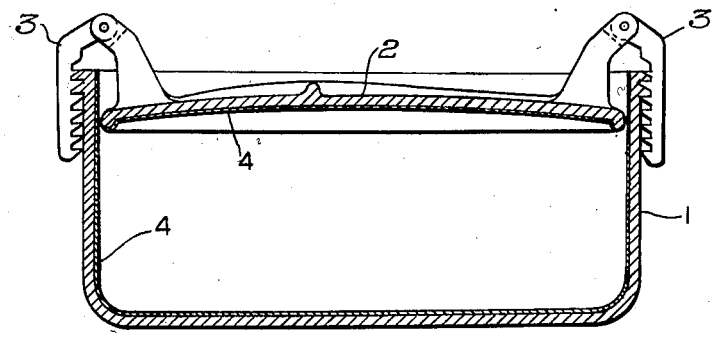
Fig. 2 is a longitudinal section taken on line II—II of Fig. 1.
Figure 3:
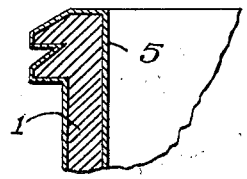
Fig. 3 is a fragmentary view of a ham boiler similar to that shown in Fig. 2, but to an enlarged scale in order to more clearly show the coating applied thereto.

The type of ham boiler which has been shown for purposes of illustration consists essentially of a vessel 1 which may be conveniently formed in the shape of a ham, a cover member 2 and locking devices 3, 3, which are preferably arranged to provide an adjustment which permits of locking the cover in a number of positions, so that the meat can be tightly compressed within the vessel. Any of the well known devices which are now in use may be employed for this purpose and it is to be understood that the form of construction of the vessel and its adjustments forms no part of the present invention. In the form of the invention indicated in Figs. 1 and 2, a coating 4 has been shown applied to the inside surfaces of the vessel and to the under side of the cover. In Fig. 3 a coating 5 has been shown applied over the entire surface of the vessel. For purposes of illustration the thickness of the coatings has been greatly exaggerated. If desired, only those portions of the vessel which come in contact with the destructive solution or vapor need be coated, as indicated in Figs. 1 and 2, although I prefer to coat the entire article both because it is simpler to do so and because a more complete protection is afforded. The coating 4, 5 is produced in the following manner. An oxide coating is first formed by any well known method. This oxide coating should be adsorptive in character and for this step I prefer to use an electrolytic method, making the vessel to be coated the anode of an electrolytic cell, the cathode of which may itself be aluminum, or some other metal. It is preferable to use sulphuric acid for the electrolyte although chromic acid or other non-volatile acids may be used with good effect. This method produces a highly adsorptive oxide coating, well suited to the purposes of the present invention. I next cause to be adsorbed in the oxide coating so formed a soluble substance inhibitory to the corrosive action of salted meats and other foods. This is accomplished by immersing the vessel in a solution of the inhibiting substance after which it is removed, inverted to remove the solution and allowed to dry or artificially dried as by means of a current of warm air.

I have found that a soluble silicate such as sodium silicate or potassium silicate gives good results as the adsorbed inhibiting substance, and that a coating so produced is particularly efficacious in preventing the corrosion and pitting which may be peculiarly severe in vessels used, for example, in the boiling or steaming of hams. Not only is corrosion effectively restricted or prevented, but the vessel is rendered more sanitary because a relatively smooth surface is maintained, thus preventing the accumulation of small particles of meat which become rancid and results in putrefaction which is seriously detrimental to the further use of the vessel for its intended purpose.

I have found, further, that particularly good results are obtained where the adsorbed substance is a sodium silicate in which the ratio of $Na_2O$ to $SiO_2$ lies between 1:3.25 and 1:3.86. I prefer to use sodium silicate in which the ratio of $Na_2O$ to $SiO_2$ is 1:3.86.

It will be seen that by my invention I have provided a cooking vessel which overcomes the difficulties which have been herein enumerated and which, at the same time, is more sanitary than any vessels heretofore known or used.

While in describing my invention I have, in the interests of clarity, employed specific language, I have no intention, in the use of such language, of excluding any equivalents or variations of the invention as set forth in the appended claims.

I claim:

1. As an article of manufacture an aluminum cooking vessel provided on its surface with a coating resistant to prolonged and repeated exposure to the action of corrosive foods, said coating comprising an adherent adsorptive oxide coating having adsorbed therein a substantial amount of a corrosion-inhibiting soluble sodium silicate having a ratio of $SiO_2$ to $Na_2O$ of at least about 3.25.

2. As an article of manufacture an aluminum ham boiler provided on its surface with a coating resistant to prolonged and repeated exposure to the action of corrosive foods, said coating comprising an adherent, adsorptive oxide coating having adsorbed therein a substantial amount of a corrosion-inhibiting soluble sodium silicate having a ratio of $Na_2O$ to $SiO_2$ of between 1:3.25 and 1:3.86.

3. As an article of manufacture an aluminum ham boiler provided on its surface with a coating resistant to prolonged and repeated exposure to the action of corrosive foods, said coating comprising an adherent, adsorptive oxide coating having adsorbed therein a substantial amount of a corrosion-inhibiting soluble sodium silicate having a ratio of $Na_2O$ to $SiO_2$ of 1:3.86.

HARRY V. CHURCHILL.